US010921108B2

(12) United States Patent
Denk et al.

(10) Patent No.: US 10,921,108 B2
(45) Date of Patent: *Feb. 16, 2021

(54) METHOD FOR MONITORING A MAGNETIC BEARING APPARATUS

(71) Applicant: Siemens Aktiengesellschaft, Munich (DE)

(72) Inventors: Joachim Denk, Berlin (DE); Bert-Uwe Köhler, Falkensee (DE); Dietmar Stoiber, Fürth (DE); Frank Viering, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 76 days.

This patent is subject to a terminal disclaimer.

(21) Appl. No.: 16/247,309

(22) Filed: Jan. 14, 2019

(65) Prior Publication Data
US 2019/0219377 A1  Jul. 18, 2019

(30) Foreign Application Priority Data
Jan. 15, 2018 (EP) .................................. 18151629

(51) Int. Cl.
*G01B 7/00* (2006.01)
*G01B 5/00* (2006.01)
(Continued)

(52) U.S. Cl.
CPC .......... *G01B 7/003* (2013.01); *F16C 32/0442* (2013.01); *F16C 32/0446* (2013.01);
(Continued)

(58) Field of Classification Search
CPC .................................. G01B 7/003; G01B 5/20
See application file for complete search history.

(56) References Cited

U.S. PATENT DOCUMENTS 3,845,996 A * 11/1974 Geweke .................. H01F 7/064
310/90.5
4,065,189 A * 12/1977 Sikorra ............... F16C 32/0446
310/90.5
(Continued)

FOREIGN PATENT DOCUMENTS

CN 102472685 A 5/2012
CN 108386449 A 8/2018
(Continued)

*Primary Examiner* — Reena Aurora
(74) *Attorney, Agent, or Firm* — Henry M. Feiereisen LLC

(57) ABSTRACT

In a method for monitoring a magnetic bearing device for an electric rotating machine, a first pair of at least essentially diametrically opposed sensors and a second pair of at least essentially diametrically opposed sensors are arranged in offset relation about an angle. A distance is determined between each of the sensors and a body of rotation arranged inside the first and second pairs of sensors. A first average distance is determined from distance values of the first pair of sensors and a second average distance is determined from distance values of the second pair of sensors. A first change in the first average distance is captured and a second change in the second average distance is captured. The first and second changes are compared and a warning signal is outputted when a difference between the first and second changes exceeds a limit value.

14 Claims, 4 Drawing Sheets

(51) Int. Cl.
*G01B 7/14* (2006.01)
*F16C 32/04* (2006.01)
*G01D 5/20* (2006.01)
*H02K 7/09* (2006.01)

(52) U.S. Cl.
CPC ...... *F16C 32/0453* (2013.01); *F16C 32/0474* (2013.01); *G01B 7/144* (2013.01); *G01D 5/20* (2013.01); *H02K 7/09* (2013.01); *F16C 2233/00* (2013.01)

(56) References Cited

U.S. PATENT DOCUMENTS

| | | | |
|---|---|---|---|
| 9,945,417 B2* | 4/2018 | Moravec | F16C 32/04 |
| 2006/0055259 A1 | 3/2006 | Hanlon et al. | |
| 2009/0134727 A1* | 5/2009 | Coenen | F16C 32/0451 |
| | | | 310/90.5 |

| | | | |
|---|---|---|---|
| 2012/0063918 A1 | 3/2012 | De Larminat | |
| 2013/0229079 A1 | 9/2013 | Omori | |
| 2014/0285046 A1 | 9/2014 | Moravec et al. | |
| 2015/0115756 A1 | 4/2015 | Walsh | |

FOREIGN PATENT DOCUMENTS

| | | |
|---|---|---|
| DE | 4215381 A1 | 11/1993 |
| DE | 102009039485 B4 | 2/2012 |
| EP | 2644917 A1 | 10/2013 |
| EP | 2781774 A1 | 9/2014 |
| EP | 3023655 A1 | 5/2016 |
| EP | 3203191 A1 | 8/2017 |
| JP | S59187113 A | 10/1984 |
| JP | H1166533 A | 6/1999 |
| JP | 2006029453 A | 2/2006 |
| JP | 2007263251 A | 10/2007 |
| RU | 2545146 C1 | 3/2015 |
| SU | 1751499 A1 | 7/1992 |

* cited by examiner

METHOD FOR MONITORING A MAGNETIC BEARING APPARATUS

CROSS-REFERENCES TO RELATED APPLICATIONS

This application claims the priority of European Patent Application, Serial No. 18151629.5, filed Jan. 15, 2018, pursuant to 35 U.S.C. 119(a)-(d), the disclosure of which is incorporated herein by reference in its entirety as if fully set forth herein.

BACKGROUND OF THE INVENTION

The present invention generally relates to the field of monitoring a magnetic bearing apparatus.

The following discussion of related art is provided to assist the reader in understanding the advantages of the invention, and is not to be construed as an admission that this related art is prior art to this invention.

A method for monitoring a magnetic bearing apparatus is used, in particular, in an active magnetic bearing of a rapidly rotating electrical rotating machine, for example, a motor, a generator, a compressor or a turbine. As a non-limiting example, a fast-rotating electrical rotating machine may be involved that can be operated with a power of at least 1 megawatt and a rotational speed of at least 5,000 rpm.

A position control of an active magnetic bearing is carried out with the aid of position measured values relating to the position of the body of rotation. The body of rotation is a rotor of the electric rotating machine, for instance. The position measured values are captured using distance sensors. The position control obtains the position of the rotor based on the measurement signals captured by the sensors as the input signal. If the distance sensors deliver false signals, the rotor distances itself from the desired position on account of the position control. It is necessary to promptly identify an error of a position sensor, which results in an incorrect measurement, for instance on account of thermal sensor drift, in order to rule out a flotation at an incorrect point. Aside from the sensor drift, measurement errors on account of a widening of the body of rotation, for instance due to centrifugal forces or temperature, are to be compensated with a position determination of a body of rotation in an active magnetic bearing.

It would therefore be desirable and advantageous to obviate prior art shortcomings and to improve monitoring of determination of the position of a body of rotation in an active magnetic bearing

SUMMARY OF THE INVENTION

According to one aspect of the present invention, a method for monitoring a magnetic bearing device for an electric rotating machine includes arranging a first pair of at least essentially diametrically opposed sensors and a second pair of at least essentially diametrically opposed sensors in offset relation about an angle, determining a distance between each of the sensors and a body of rotation arranged inside the first and second pairs of sensors, determining a first average distance from distance values of the first pair of sensors and a second average distance from distance values of the second pair of sensors, capturing a first change in the first average distance, capturing a second change in the second average distance; comparing the first and second changes, and outputting a warning signal when a difference between the first and second changes exceeds a limit value.

The present invention resolves prior art problems, in particular in the case of an active magnetic bearing, which is embodied in particular as a radial bearing and/or as an axial bearing, by linking a sensor evaluation of two independently controlled sensor axes, which are arranged offset by an angle relative to one another, in order therefore to identify both with a rotating and also with a stationary rotor whether the distance sensor system delivers defective values. In the event of a fault, suitable safety measures can be introduced. The sensor system supplies defective values for instance in the case of a, in particular thermal, sensor drift of at least one sensor. An average change in distance compared with a stored data record is determined from the determined distance values of the opposingly arranged sensors, wherein the average change in distance corresponds to half the sum of the changes in distance of the two opposing sensors. A change in distance corresponds to the difference between the determined distances of the measurement and the distances of the data record. The preceding data record is based on a simulation, for instance. If the difference in the changes in distance $\Delta d1$, $\Delta d2$ exceeds a limit value, at least one sensor error is present. Such a sensor error is determined by way of an error signal, for instance. The limit value should be selected such that a faulty activation is avoided, but a collision between the body of rotation and a safety bearing, for instance, is still reliably prevented A thermal or centrifugal force-induced rotor expansion is not problematic, since the expansion takes place at least essentially uniformly in the radial direction. Since, with the error detection, the changes in the average distances and no absolute values are compared, the method is simple and robust with respect to external influences. A combined evaluation of both sensor axes enables a sensor monitoring without additional sensor systems. The monitoring of the sensor data can therefore be carried out cost-effectively and efficiently.

The output warning signal can be embodied as an acoustic, optical and/or electrical signal, for instance. The electric rotating machine can be a motor, a generator, a compressor or a turbine, for instance. In particular, the electric rotating machine can be operated with a power of at least 1 megawatt, and a rotational speed of at least 5000 rpm.

According to another advantageous feature of the present invention, the first and second changes can be related to a preceding measurement. The measurement data of a preceding measurement are very precise, particularly compared with a simulation, since at least temporally constant boundary conditions and environmental influences are taken into account in the measurement, as a result of which a reliable error detection is enabled.

According to another advantageous feature of the present invention, the preceding measurement can be a calibration measurement. With a calibration measurement of this type, the body of rotation is arranged in a reference position. A higher limit value can be selected as a result, whereby the reliability of the error detection is improved.

According to another advantageous feature of the present invention, a position of the body of rotation can be controlled during the calibration measurement such that the distances between the sensors of the first and second pairs of sensors and the body of rotation are the same and correspond to a standard distance. A central positioning of the body of rotation reduces the probability of a collision and improves the reliability of the error detection.

According to another advantageous feature of the present invention, the sensors of the first and second pairs of sensors can be configured as inductive displacement sensors so as to detect the distances in a noncontact manner. An inductive displacement sensor is also called an eddy current sensor. Sensors of this type are very precise, cost-effective and reliable.

According to another advantageous feature of the present invention, the second pair of sensors can be arranged about an angle of 60° to 120° in relation to the first pair of the sensors. An arrangement of the sensor axes of this type makes it easier to evaluate the measurements. Advantageously, the second pair of diametrically opposed sensors can be arranged at least essentially at right angles to the first pair of diametrically opposed sensors. An arrangement of the sensor axes of this type makes it easier to evaluate the measurements.

According to another advantageous feature of the present invention, a redundant sensor can be arranged in a region of each one of the sensors of the first and second pairs of sensors, and a distance of the redundant sensor can be determined relative to the body of rotation. A faulty sensor can be detected using at least one additional sensor, beyond the inconsistency of the sensor system.

According to another advantageous feature of the present invention, the presence of a faulty one of the sensors of the first and second pairs of sensors can be detected by comparing the determined distances relative to the body of rotation. Since essentially identical boundary conditions apply to the sensors of the axis in question and the next adjacent redundant sensor with respect to the distance from the body of rotation, by comparing the distances of the next adjacent sensors, an axis can in particular be identified with a faulty sensor and by switching the control from the sensor adjacent to the redundant sensor to the redundant sensor, the faulty sensor itself can be detected. A shutdown time of the electric rotating machine is reduced on account of a direct identification of a faulty sensor of this type without further measurements and the availability of the machine is therefore improved.

According to another aspect of the present invention, a control unit includes a programmable logic module, and a computer program embodied in a non-transitory computer readable medium, wherein the computer program, when loaded into the programmable logic module and executed by the programmable logic module, causes the programmable logic module to perform a method according to the present invention.

According to still another aspect of the present invention, a sensor device includes a control unit, and at least four sensors operably connected to the control unit and configured to determine a distance between each of the sensors and a body of rotation arranged inside the first and second pairs of sensors.

The workflow can thus be controlled by a control unit. The method is executed by a computer program and, for example, a microcontroller or a different programmable logic module. The control unit can be arranged, for example, in the sensor device.

According to yet another aspect of the present invention, a magnetic bearing apparatus includes a magnetic bearing, and a sensor device for monitoring the magnetic bearing, with the sensor device being configured as set forth above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
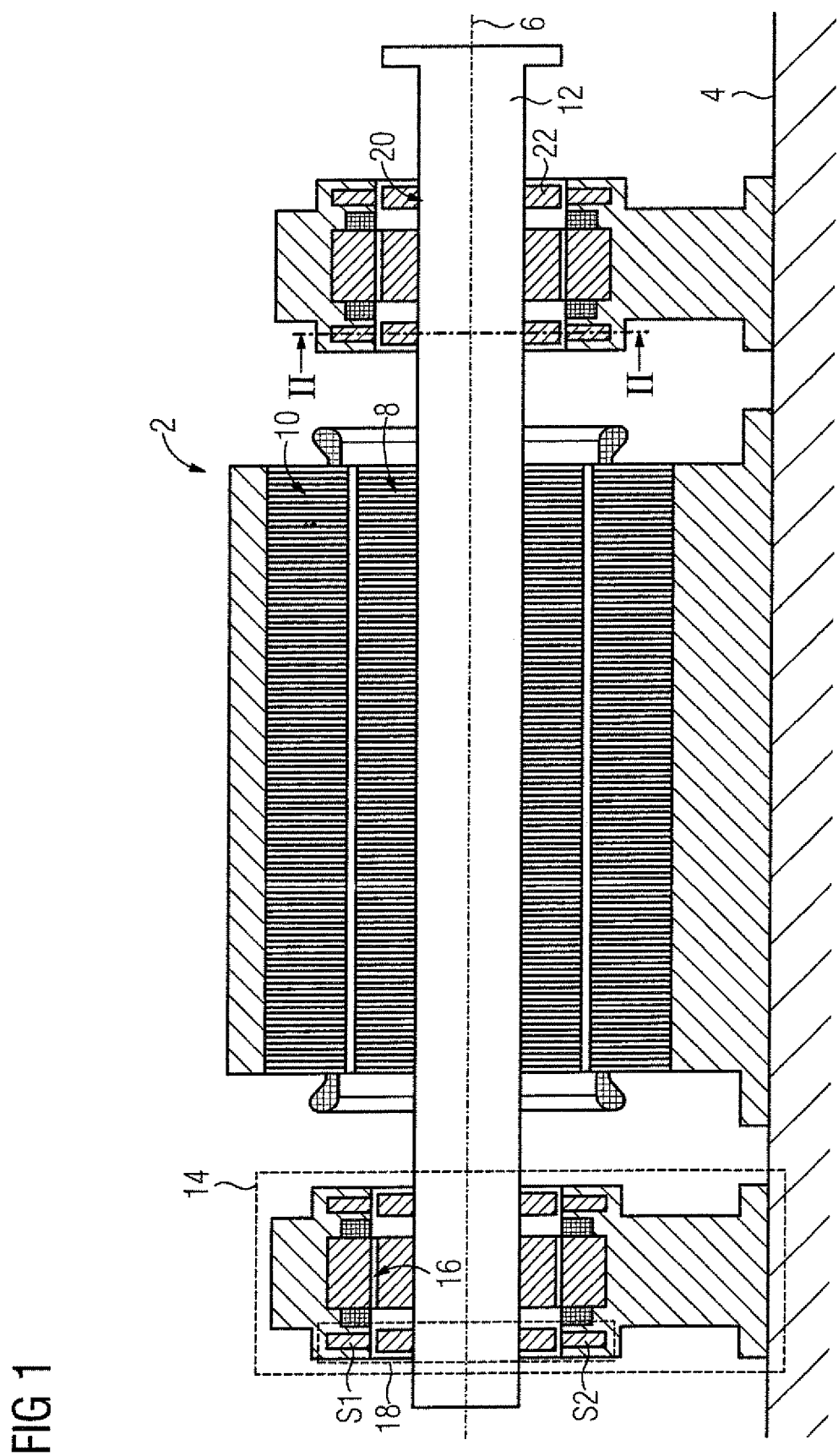
FIG. 1 shows a longitudinal section of an electric rotating machine according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of an electrical rotating machine according to the present invention, generally designated by reference numeral 2. The electrical rotating machine 2 stands on a base 4 and can be embodied as a motor or as a generator and has a rotor 8 which can rotated about an axis of rotation 6 and a stator 10 surrounding the rotor 8. A shaft 12 of the rotor 8 is mounted in a contact-free manner on both axial ends by an active magnetic bearing device 14 in each case. Alternatively, the electric rotating machine 2 is embodied as a turbine with a shaft 12, which is mounted in a contact-free manner on the axial ends by an active magnetic bearing device 14 in each case.

A position of a body of rotation 20 is determined by way of a sensor device 18, wherein the body of rotation 20 includes the rotor 8 with the shaft 12. The body of rotation 20 optionally has a sensor ring 22 in the region of the sensor device 18, which is connected to the shaft 12. For instance, the sensor ring 22 is connected to the shaft 12 with a material fit or shrunk onto the shaft 12. The body of rotation 20 has an at least essentially circular cross-section.

The sensor device includes sensors S1, S2 arranged around the periphery of the shaft 12, which are embodied as inductive displacement sensors and are suited to capturing distances between the body of rotation 20 and the respective sensors S1, S2 in a noncontact manner. The inductive displacement sensors are used, for instance, to measure an impedance and preferably a change in the impedance by way of an air gap.

The magnetic bearing device 14 is embodied by way of example as a radial bearing. Using the sensor device 18 for an axial bearing is equally applicable, wherein in the case of an axial bearing, the sensor device 18 is provided to determine the position of the body of rotation 20 in the axial direction.

Figure 2:
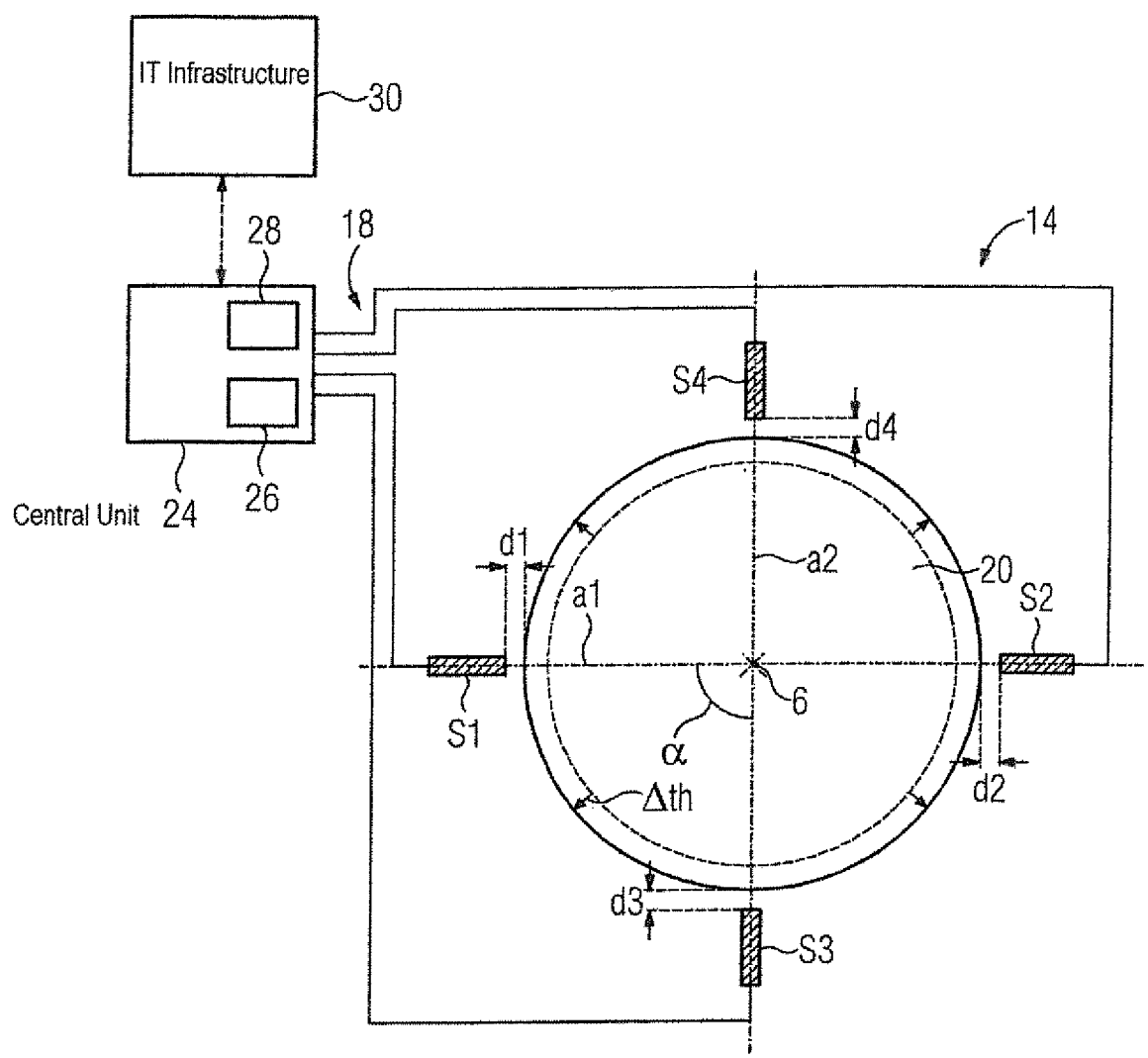
FIG. 2 shows a cross-section through a magnetic bearing apparatus, taken along the section line II-II in FIG. 1, depicting a first embodiment of a sensor device.

FIG. 2 shows a cross-section through a magnetic bearing device 14, taken along the section line II-II in FIG. 1 and depicting a first embodiment of a sensor device 18, wherein a body of rotation 20 is mounted in a contact-free manner by means of the magnetic bearing device 14. The sensor device 18 includes two pairs of diametrically opposed sensors S1, S2, S3, S4, each of which forms an axis a1, a2, wherein the second axis a2 of the second pair S3, S4 is arranged about an angle α of approximately 90° with respect to the first axis a1 of the first pair S1, S2. The sensors S1, S2, 33, S4 are connected to a central unit 24, which includes an evaluation unit 26 and a control unit 28. The measured sensor data is transmitted to the central unit 24 electrically, in particular in a cable-bound manner, or optically via optical fibers, for instance. The sensors S1, S2, S3, S4 are embodied as inductive displacement sensors, by means of which the distances d1, d2, d3, d4 of the respective sensor S1, S2, S3, S4 relative to the body of rotation 20 are each captured in a noncontact manner. The determined data is digitalized and sent at least partially to an IT infrastructure 30. An IT infrastructure 30 is at least one local computer system, for instance, or a cloud and provides storage space, computing power and application software. Storage space, computing power and application software are made available in a cloud as a service via the Internet. The digital data transmission to the IT infrastructure 30 is carried out in a wireless, wired or optical manner. For instance, the data is transmitted via Bluetooth or WLAN.

In order to check whether a sensor outputs an incorrect value, a first average distance is determined from the distance values of the first sensor pair S1, S2 and a second average distance is determined from the distance values of the second sensor pair S3, S4, wherein a first change Δd1 in the first average distance and a second change Δd2 in the second average distance is captured compared with a preceding measurement. Hereupon, the changes Δd1, Δd2 to the average distances are compared, wherein, as soon as a difference in the changes in distance Δd1, Δd2 exceeds a limit value, a warning signal is output. The limit value is to be selected such that a faulty activation is avoided, but a collision between the body of rotation 20 and a safety bearing for instance is still reliably prevented.

The warning signal is embodied as an acoustic, optical and/or electric signal, for instance, wherein with the output of a warning signal, the electric rotating machine 2 is moved into a safe state, for instance.

A thermal rotor expansion Δth which occurs during operation of the electric rotating machine, i.e. a slight, yet uniform enlargement of the diameter of the body of rotation caused by the rotor 8 heating up, is not problematic for the aforedescribed change, because changes Δd1, Δd2 to the average distances are compared and there is no comparison between the absolute values. An application on axial bearings is possible. The further embodiment of the magnetic bearing device 14 in FIG. 2 corresponds to that in FIG. 1.

Figure 3:
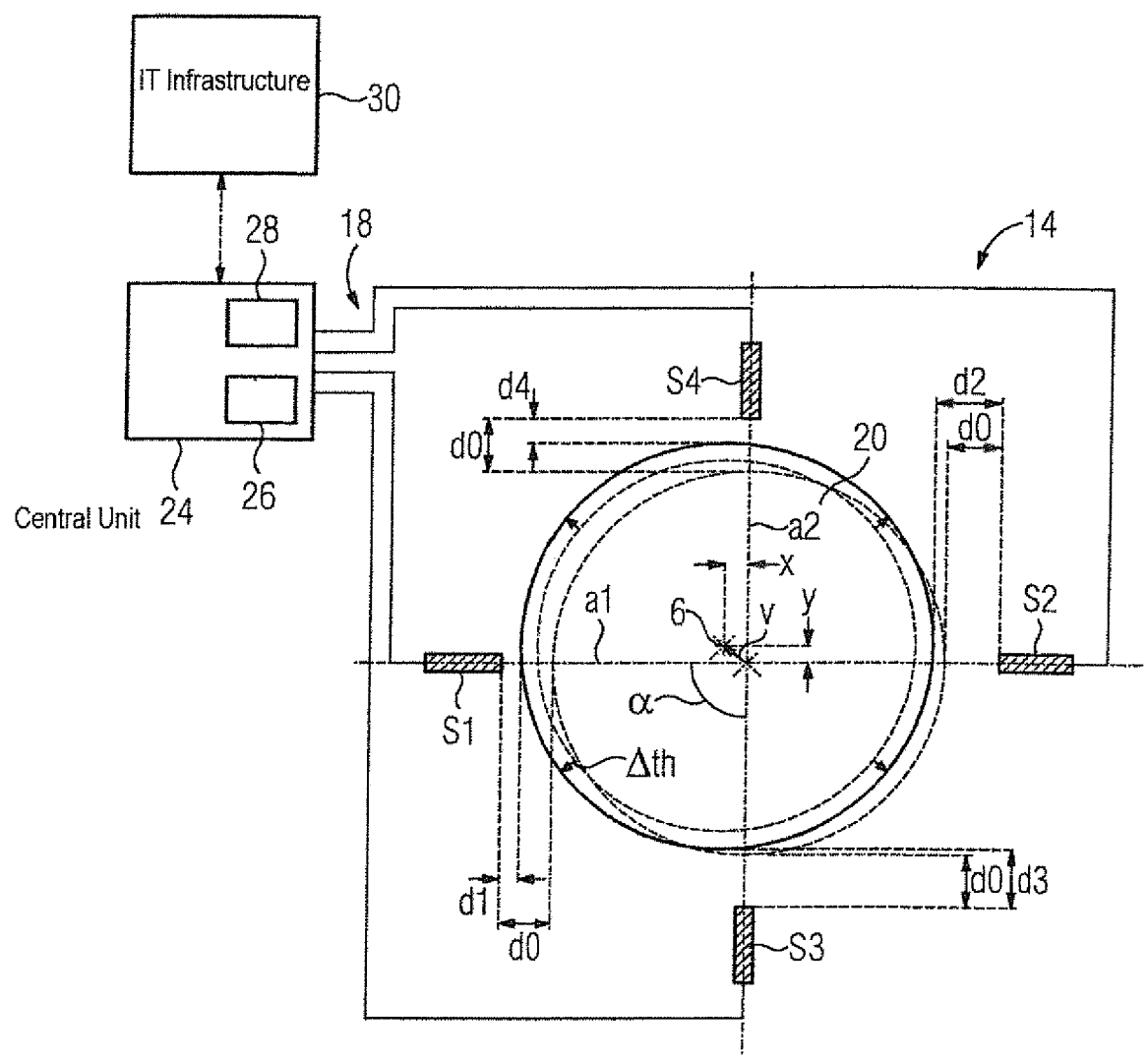
FIG. 3 shows a cross-section through a magnetic bearing device with a first embodiment of a sensor device having a displacement of the body of rotation with respect to a calibration measurement.

FIG. 3 shows a cross-section through a magnetic bearing device 14 with a first embodiment of a sensor device 18 and with a displacement V of the body of rotation 20 with respect to a calibration measurement. The displacement V of the body of rotation 20 is very small compared with the essentially circular curvature of the surface of the body of rotation 20 in the peripheral direction, so that the surface of the body of rotation 20 in the region of the displacement V is to be assumed to be essentially straight.

The position of the body of rotation 20 during the calibration measurement has been regulated such that the distances d1, d2, d3, d4 of the sensors S1, S2, S3, S4 from the body of rotation 20 are equal and correspond to a standard distance d0. The axis of rotation 6 of the body of rotation 20 is moved in the direction of the first sensor S1 about x with respect to the first axis a1 and in the direction of the fourth sensor S4 about y with respect to the second axis a2. A rotor expansion Δth also took place since the calibration measurement. An exemplary measurement error in the first sensor S1 is modelled by an error value ε.

The sensors S1, S2, S3, S4 supply the following distances d1, d2, d3, d4 compared with the standard distance d0:

$$d1 = d0 - x - \Delta th \pm \varepsilon$$

$$d2 = d0 + x - \Delta th$$

$$d3 = d0 + y - \Delta th$$

$$d4 = d0 - y - \Delta th$$

The following average changes in distance Δd1, Δd2 are produced herefrom.

$$\Delta d1 = \frac{(d1-d0)+(d2-d0)}{2} = \frac{-x-\Delta th \pm \varepsilon + x - \Delta th}{2} = -\Delta th \pm \frac{\varepsilon}{2}$$

$$\Delta d2 = \frac{(d3-d0)+(d4-d0)}{2} = \frac{y - \Delta th - y - \Delta th}{2} = -\Delta th$$

The comparison of the average distances Δd1, Δd2 shows that a sensor error is present, since the first average distance Δd1 differs by ±ε/2 from the second average distance Δd2.

Moreover, the calculation shows that the method is insensitive to a, possibly even desired, displacement V of the body of rotation 20. The thermal rotor expansion Δth is not problematic when detecting a sensor error by comparing the changes Δd1, Δd2 in the average distances, because the rotor expansion Δth is carried out uniformly in all directions. If the reference measurement is not to be the above described calibration measurement, in other words the distances d1, d2, d3, d4 of the sensors S1, S2, S3, S4 from the body of rotation 20 are not equal to d0 at the point in time of calibration, the method still works since changes to the average distances Δd1, Δd2 are compared. The further embodiment of the magnetic bearing device 14 in FIG. 3 corresponds to that in FIG. 1.

Figure 4:
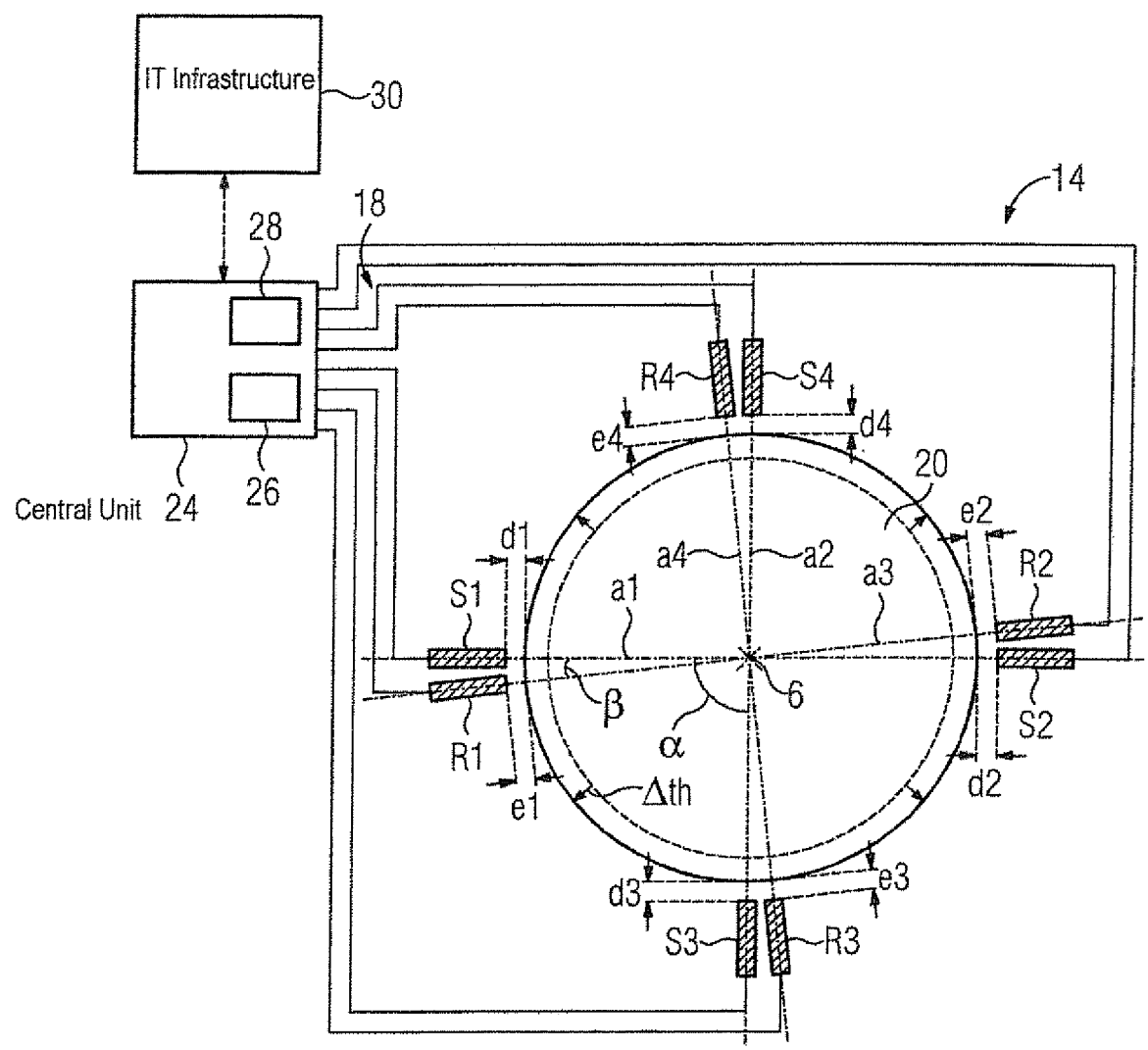
FIG. 4 shows a cross-section through a magnetic bearing apparatus with a second embodiment of a sensor device.

FIG. 4 shows a cross-section through a magnetic bearing device 14 with a second embodiment of a sensor device 18. A redundant sensor R1, R2, R3, R4 is assigned to the sensors S1, S2, S3, S4 in each case, in order to detect a faulty sensor directly from a possible inconsistency in the sensor system. The redundant sensors R1, R2, R3, R4 are arranged diametrically opposite one another in pairs, wherein the pairs each form an axis. The axes a3, a4 of the redundant sensors R1, R2, R3, R4 are arranged rotated about an offset angle β in the range of up to 10° with respect to the axes a1, a2 of the sensors S1, S2, S3, S4. With respect to the distance from the body of rotation 20, the essentially identical boundary conditions apply to the sensors S1, S2, S3, S4 and their next adjacent redundant sensors R1, R2, R3, R4.

The distances e1, e2, e3, e4 between the redundant sensors R1, R2, R3, R4 and the body of rotation 20 are determined, wherein a faulty sensor S1, S2, S3, S4, R1, R2, R3, R4 is detected by comparing the determined distances d1, d2, d3, d4, e1, e2, e3, e4. The further embodiment of the magnetic bearing device 14 in FIG. 4 corresponds to that in FIG. 2.

To summarize, the invention relates to a method for monitoring a magnetic bearing device 14 for an electric rotating machine 2. To improve a monitoring of the position determination of a body of rotation in an active magnetic bearing, it is proposed that the magnetic bearing device 14 has a first pair of at least essentially diametrically opposed sensors S1, S2 and a second pair of at least essentially diametrically opposed sensors S3, S4, which are arranged offset by an angle α with respect to the first pair of sensors S1, S2, wherein a distance d1, d2, d3, d4 of a sensor S1, S2, S3, S4 from a body of rotation 20 which is arranged within the sensor pairs S1, S2, S3, S4 is measured in each case, wherein a first average distance is determined from the distance values of the first sensor pair S1, S2 and a second average distance is determined from the distance values of the second sensor pair S3, S4, wherein a first change Δd1 in the first average distance and a second change Δd2 in the second average distance are captured, wherein the changes Δd1, Δd2 in the average distances are compared, wherein as soon as a difference in the average changes in distance Δd1, Δd2 exceeds a limit value, a warning signal is output.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for monitoring a magnetic bearing device for an electric rotating machine, said method comprising:
   arranging a first pair of at least essentially diametrically opposed sensors and a second pair of at least essentially diametrically opposed sensors in offset relation about an angle;
   determining a distance between each of the sensors and a body of rotation arranged inside the first and second pairs of sensors;
   determining a first average distance from distance values of the first pair of sensors and a second average distance from distance values of the second pair of sensors;
   capturing a first change in the first average distance;
   capturing a second change in the second average distance;
   comparing the first and second changes; and
   outputting a warning signal when a difference between the first and second changes exceeds a limit value.

2. The method of claim 1, further comprising relating the first and second changes to a preceding calibration measurement.

3. The method of claim 2, further comprising controlling a position of the body of rotation during the calibration measurement such that the distances between the sensors of the first and second pairs of sensors and the body of rotation are equal and correspond to a standard distance.

4. The method of claim 1, further comprising configuring the sensors of the first and second pairs of sensors as inductive displacement sensors so as to detect the distances in a noncontact manner.

5. The method of claim 1, wherein the second pair of sensors is arranged about an angle of 60° to 120° in relation to the first pair of the sensors.

6. The method of claim 1, further comprising:
   arranging a redundant sensor in a region of each one of the sensors of the first and second pairs of sensors; and
   determining a distance of the redundant sensor relative to the body of rotation.

7. The method of claim 6, further comprising detecting the presence of a faulty one of the sensors of the first and second pairs of sensors by comparing the determined distances relative to the body of rotation.

8. The method of claim 1, further comprising moving the electric rotating machine into a safe state in response to the output of the warning signal.

9. A computer program embodied in a non-transitory computer readable medium, wherein the computer program, when loaded into a control unit and executed by the control unit, causes the control unit to perform the method as set forth in claim 1.

10. A computer program product, comprising:
    a control unit; and
    a computer program embodied in a non-transitory computer readable medium, wherein the computer program, when loaded into the control unit and executed by the control unit, causes the control unit to perform the method of claim 1.

11. A control unit, comprising:
    a programmable logic module; and
    a computer program embodied in a non-transitory computer readable medium, wherein the computer program, when loaded into the programmable logic module and executed by the programmable logic module, causes the programmable logic module to perform the steps of:
        arranging a first pair of at least essentially diametrically opposed sensors and a second pair of at least essentially diametrically opposed sensors in offset relation about an angle;
        determining a distance between each of the sensors and a body of rotation arranged inside the first and second pairs of sensors;
        determining a first average distance from distance values of the first pair of sensors and a second average distance from distance values of the second pair of sensors;
        capturing a first change in the first average distance;
        capturing a second change in the second average distance;
        comparing the first and second changes; and
        outputting a warning signal when a difference between the first and second changes exceeds a limit value.

12. A sensor device, comprising:
    a control unit as set forth in claim 11; and
    at least four sensors operably connected to the control unit and configured to determine a distance between each of the sensors and a body of rotation arranged inside the first and second pairs of sensors.

13. A magnetic bearing device, comprising:
    a magnetic bearing; and
    a sensor device for monitoring the magnetic bearing, said sensor device comprising a control unit as set forth in claim 11, and at least four sensors operably connected to the control unit and configured to determine a distance between each of the sensors and a body of rotation arranged inside the first and second pairs of sensors.

14. An electric rotating machine, comprising a magnetic bearing device as set forth in claim 13.

* * * * *